United States Patent
Brodersen et al.

(10) Patent No.: US 9,716,774 B2
(45) Date of Patent: Jul. 25, 2017

(54) SYSTEM AND METHOD FOR SYNCING A USER INTERFACE ON A SERVER DEVICE TO A USER INTERFACE ON A CLIENT DEVICE

(75) Inventors: Rainer Brodersen, San Jose, CA (US); Amandeep Jawa, San Francisco, CA (US); Alan Cannistraro, San Francisco, CA (US); Daniel Davis, San Francisco, CA (US); Jeffrey L. Robbin, Los Altos, CA (US)

(73) Assignee: APPLE INC., Cupertino, CA (US)

( * ) Notice: Subject to any disclaimer, the term of this patent is extended or adjusted under 35 U.S.C. 154(b) by 1994 days.

(21) Appl. No.: 12/171,250

(22) Filed: Jul. 10, 2008

(65) Prior Publication Data

US 2010/0011299 A1 Jan. 14, 2010

(51) Int. Cl.
*H04L 29/08* (2006.01)

(52) U.S. Cl.
CPC .............. *H04L 67/36* (2013.01); *H04L 67/04* (2013.01)

(58) Field of Classification Search
CPC ................................ G06F 3/048; G06F 17/243
(Continued)

(56) References Cited

U.S. PATENT DOCUMENTS

| 5,646,608 A | 7/1997 | Shintani |
| 5,652,849 A | 7/1997 | Conway et al. |

(Continued)

FOREIGN PATENT DOCUMENTS

| JP | 2001/045575 | 2/2001 |
| JP | 2003-143670 | 5/2003 |

(Continued)

OTHER PUBLICATIONS

Bavor, Clay and Levinson, Jesse, "Wireless Home and Office Appliance Management and Integration", U.S. Appl. No. 11/195,586, filed Aug. 1, 2005.

(Continued)

*Primary Examiner* — Angie Badawi
(74) *Attorney, Agent, or Firm* — Nicholas Panno; Page Ponsford; DLA Piper LLP US (57) ABSTRACT

A system, method, and computer-readable medium for method for syncing a user interface on a server device to a user interface on a client device are disclosed. The method includes broadcasting a signal from a server device to a client device when the server device presents an active user input interface on a display screen, wherein the active user input interface illustrates input from a user via a remote control that is separate from the client device, wherein the remote control requires multiple steps for inputting a character. The method next includes establishing a connection between the server device and the client device if certain pre-defined criteria are met. Next the method includes transmitting parameters for displaying a client user input interface on the connected client device that is associated with the active user input interface, including loading existing data in an input field of the active user input interface into a client input field on the client device. The method then includes receiving character input sent from the connected client device to the server device via the client user input interface, wherein the character is received via a single step. The method then includes updating the input field of the active user input interface with the received character input from the client user input interface, and removing the client user input interface on the client device upon the occurrence of an event.

12 Claims, 7 Drawing Sheets

(58) Field of Classification Search
USPC .......................................................... 715/744
See application file for complete search history.

(56) References Cited

U.S. PATENT DOCUMENTS

| | | | |
|---|---|---|---|
| 5,920,856 | A | 7/1999 | Syeda-Mahmood |
| 5,983,218 | A | 11/1999 | Syeda-Mahmood |
| 6,127,941 | A | 10/2000 | Van Ryzin |
| 6,130,726 | A | 10/2000 | Darbee et al. |
| 6,133,847 | A | 10/2000 | Yang |
| 6,160,551 | A | 12/2000 | Naughton et al. |
| 6,185,491 | B1 | 2/2001 | Gray et al. |
| 6,211,856 | B1 | 4/2001 | Choi et al. |
| 6,243,713 | B1 | 6/2001 | Nelson et al. |
| 6,255,961 | B1 | 7/2001 | Van Ryzin et al. |
| 6,314,326 | B1 | 11/2001 | Fuchu |
| 6,344,861 | B1 | 2/2002 | Naughton et al. |
| 6,396,523 | B1 | 5/2002 | Segal et al. |
| 6,437,836 | B1 | 8/2002 | Huang et al. |
| 6,476,825 | B1 | 11/2002 | Croy |
| 6,510,210 | B1 | 1/2003 | Baughan |
| 6,523,022 | B1 | 2/2003 | Hobbs |
| 6,633,281 | B2 | 10/2003 | Lin et al. |
| 6,728,729 | B1 | 4/2004 | Jawa et al. |
| 6,765,557 | B1 | 7/2004 | Segal et al. |
| 6,791,467 | B1 | 9/2004 | Ben-Ze'ev |
| 6,799,201 | B1 | 9/2004 | Lee et al. |
| 6,844,886 | B1 | 1/2005 | Yanagawa et al. |
| 6,882,299 | B1 | 4/2005 | Allport |
| 6,892,067 | B1 | 5/2005 | Sharma et al. |
| 6,914,551 | B2 | 7/2005 | Vidal |
| 6,970,127 | B2 | 11/2005 | Rakib |
| 7,084,780 | B2 | 8/2006 | Nguyen et al. |
| 7,111,242 | B1 | 9/2006 | Grooters |
| 7,129,853 | B2 | 10/2006 | Kaplan |
| 7,224,903 | B2 | 5/2007 | Colmenarez et al. |
| 7,230,563 | B2 | 6/2007 | Vidal |
| 7,356,334 | B2 | 4/2008 | Yamashita |
| 7,356,570 | B1* | 4/2008 | Tuli ............................. 709/217 |
| 7,369,868 | B2 | 5/2008 | Dunko et al. |
| 7,375,673 | B2 | 5/2008 | Spilo |
| 7,535,465 | B2 | 5/2009 | Morse et al. |
| 7,570,945 | B2 | 8/2009 | Lee et al. |
| 7,571,014 | B1 | 8/2009 | Lambourne et al. |
| 2001/0045819 | A1 | 11/2001 | Harris et al. |
| 2002/0031120 | A1 | 3/2002 | Rakib |
| 2002/0059368 | A1 | 5/2002 | Reynolds |
| 2002/0059637 | A1 | 5/2002 | Rakib |
| 2002/0097229 | A1 | 7/2002 | Rose |
| 2002/0144271 | A1 | 10/2002 | Behagen et al. |
| 2003/0002638 | A1 | 1/2003 | Kaars |
| 2003/0038849 | A1 | 2/2003 | Craven et al. |
| 2003/0080874 | A1 | 5/2003 | Yumoto et al. |
| 2003/0162495 | A1 | 8/2003 | Yonemoto et al. |
| 2003/0193426 | A1 | 10/2003 | Vidal |
| 2003/0237043 | A1 | 12/2003 | Novak et al. |
| 2004/0174863 | A1 | 9/2004 | Caspi et al. |
| 2004/0247138 | A1 | 12/2004 | Wang |
| 2004/0247139 | A1 | 12/2004 | Wang |
| 2004/0267899 | A1 | 12/2004 | Rahman et al. |
| 2005/0050229 | A1 | 3/2005 | Comeau et al. |
| 2005/0168372 | A1 | 8/2005 | Hollemans |
| 2005/0170744 | A1 | 8/2005 | Smith et al. |
| 2005/0193017 | A1 | 9/2005 | Kim |
| 2005/0267792 | A1* | 12/2005 | Mehrotra et al. ................. 705/9 |
| 2006/0026536 | A1 | 2/2006 | Hotelling et al. |
| 2006/0085819 | A1* | 4/2006 | Bruck et al. ..................... 725/52 |
| 2006/0127034 | A1 | 6/2006 | Brooking et al. |
| 2006/0227032 | A1 | 10/2006 | Vidal |
| 2007/0002784 | A1 | 1/2007 | Edwards |
| 2007/0008280 | A1 | 1/2007 | Ullmann |
| 2007/0150554 | A1 | 6/2007 | Simister |
| 2007/0257982 | A1 | 11/2007 | Luo et al. |
| 2007/0283033 | A1 | 12/2007 | Bloebaum et al. |
| 2008/0008125 | A1* | 1/2008 | Pham et al. .................. 370/329 |
| 2008/0012723 | A1 | 1/2008 | Wang |
| 2008/0043685 | A1 | 2/2008 | Sandblom |
| 2008/0062136 | A1* | 3/2008 | Nakamura et al. ........... 345/171 |
| 2008/0068506 | A1 | 3/2008 | Urisu |
| 2008/0086563 | A1* | 4/2008 | Shin et al. ..................... 709/225 |
| 2008/0122847 | A1* | 5/2008 | Takano et al. ................ 345/428 |
| 2008/0164982 | A1 | 7/2008 | Andrews et al. |
| 2008/0178224 | A1 | 7/2008 | Laude et al. |
| 2008/0189255 | A1 | 8/2008 | Zatloukal et al. |
| 2008/0209487 | A1 | 8/2008 | Osann et al. |
| 2008/0284907 | A1* | 11/2008 | Chiao .......................... 348/448 |
| 2009/0019506 | A1 | 1/2009 | Lukins et al. |
| 2009/0044245 | A1 | 2/2009 | Yamamoto et al. |
| 2009/0047992 | A1 | 2/2009 | Ortiz et al. |
| 2009/0150553 | A1* | 6/2009 | Collart et al. ................ 709/229 |
| 2009/0153288 | A1 | 6/2009 | Hope et al. |
| 2009/0156251 | A1 | 6/2009 | Cannistraro et al. |
| 2009/0216855 | A1 | 8/2009 | Lang et al. |
| 2009/0268754 | A1 | 10/2009 | Palm et al. |
| 2009/0300508 | A1 | 12/2009 | Krampf et al. |
| 2010/0011299 | A1 | 1/2010 | Brodersen |
| 2010/0049835 | A1 | 2/2010 | Ko et al. |
| 2010/0293488 | A1 | 11/2010 | Shima et al. |
| 2011/0018817 | A1 | 1/2011 | Kryze et al. |

FOREIGN PATENT DOCUMENTS

| | | |
|---|---|---|
| JP | 2013141327 | 8/2013 |
| WO | WO 98/57249 | 12/1998 |
| WO | WO 02/086692 A1 | 10/2002 |
| WO | WO 2005/078676 | 8/2005 |

OTHER PUBLICATIONS

"UPnP Media Controller" [Online]. Cidero. [retrieved on Dec. 12, 2007]: <URL: www.cidero.cornimediacontroller.html>.

Philips and Samsung spearhead new CEA-2014 (Web4CE) HTML-based remote user interfaces for UPnP home-networked applications and Internet services [Online]. HiddenWires [retrieved on Nov. 7, 2007]: <URL: hiddenwires.co.ukiresourcenews2006/news20060223-12.html.

Kelly et al. "Designing Rf Remote Controls for DTV Products" [Online]. Digital TV Design Line. [retrieved on 2 Nov. 7, 2007]: <URL: www.digitaltvdesignline.com/showArticle.jhtml?printableArticle-true&articleId=202 100019>.

"Apple Introduces iTunes—World's Best and Easiest to Use Jukebox Software," Macworld Expo, San Francisco, Jan. 9, 2001, downloaded from http://www.apple.com/pr/library/2001/jan/09itunes.html, on Jul. 10, 2002, 2 pages.

"Apple Announces iTunes 2," Press Release, Apple Computer, Inc., Oct. 23, 2001, downloaded from: http://www.apple.com/pr/library/2001/oct/23itunes.html, on Jul. 10, 2002, 2 pages.

Specification Sheet, iTunes 2, Apple Computer, Inc., Oct. 31, 2001.

"SoundJam MP Plus Manual, version 2.0"—MP3 Player and Encoder for Macintosh by Jeffrey Robbin, Bill Kincaid and Dave Heller, manual by Tom Negrino, published by Casady & Greene, Inc., 2000.

"WWDC 2002 Keynote Coverage," MacCentral Staff, May 6, 2002, downloaded from: http://naccentral.macworld.com/news/2002/05/06/wwdckeynote on Nov. 12, 2003, 8 pages.

"Review: SoundJam MP Plus 2.5.1," Daniel Chvatik, Oct. 2000, downloaded from: http://www.atpm.com/6.10/soundjam.shtml on Nov. 12, 2003, 8 pages.

"iHam on iRye: 2.0—VersionTracker," downloaded from: http://www.versiontracker.com/dyn/moreinfo/macosx/13021 on Nov. 12, 2003, 3 pages.

"iCommune—Share your music over a network," downloaded from http://www.icommune.sourceforge.net/ on Nov. 12, 2003, 1 page.

* cited by examiner

SYSTEM AND METHOD FOR SYNCING A USER INTERFACE ON A SERVER DEVICE TO A USER INTERFACE ON A CLIENT DEVICE

RELATED APPLICATIONS

The present application is related to U.S. Pat. No. 6,728,729, the content of which are incorporated herein by reference. The present application is also related to U.S. application Ser. No. 11/955,383, filed Dec. 12, 2007, and U.S. application Ser. No. 11/955,382, filed Dec. 12, 2007. The content of each of these applications is incorporated herein by reference.

BACKGROUND OF THE INVENTION

1. Field of the Invention

The invention relates to device syncing, and more particularly to providing or synchronizing an input user interface on a client device that is associated with an active input user interface on a server device.

2. Introduction

As technology advances digital media content servers are becoming cheaper and more accessible, thereby increasing their popularity with consumers. These digital media content servers may be connected to a display such as a television, projector, or computer monitor and connected to a local network. The digital media content servers may also connect to outside networks such as the Internet allowing a user to access online websites, online digital content stores, and other online applications. Furthermore, the digital media content server may be connected to a home audio amplification system. The digital media content server may connect to other electronic devices as well.

Digital media content servers typically store digital media files, such as music files, videos, pictures, and documents. A user, for example, can play a video file of a television show stored on the server and view the television show on a connected display. The content server may similarly play movie files. The server may also play a digital music file through a connected audio amplification system or through the display's audio amplification system. Digital files can be stored on an internal or external storage device (such as a hard drive or solid-state drive) connected to the digital file server, while in other cases the digital files are stored on an outside client device and streamed to the server over a network. In this latter context, the files can be streamed from the Internet or from a local networked client device. For example, a user can stream a remotely-stored .mp3 file over a broadband Internet connection to the server and then to a connected audio system. In another example, a user can stream an .mp3 file stored on a user's laptop over the home network to the server to play on a connected audio system. Other digital files such as movies, documents, pictures, games, and applications may be streamed in a similar manner.

The digital file content server may present to the user an input user interface. For example, a user may wish to type in a string of characters for search for a particular artist within the stored music library. Additionally, a user may wish to input a string of characters to search for a song name, album title, or any other metadata associated with the digital file within the locally stored library. A user can also enter text to modify song titles, metadata, playlist titles, etc. This interaction may be achieved via a remote control that enables a user to navigate through the interface to select characters to input.

Additionally, digital file content server may enter an input user interface based on a request for a password. For example, a user may wish to type in a string of characters to log into a user's online profile for a given application or to access content protected by parental controls.

Typically a user could input this data with the use of a remote control. However, these remote controls usually have limited user interfaces that require multiple steps for the entry of each character of an active input user interface. For example, a remote control with directional arrows can be used to navigate an on-screen character grid to select characters step by step. Requiring multiple steps for each character input increases the time needed to input the chosen character string into an active input user interface, as compared to methods that only require one step per character.

Accordingly, what is needed in the art is an improved way to input characters into a user interface on a server device.

SUMMARY

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

This invention disclosure describes a system, method, and computer-readable medium for syncing a user interface on a server device to a user interface on a connected client device. The system allows the input of characters with a single step through the user interface of the client device. In an alternate approach, the number of steps and thus ease of inputting characters or other information is reduced in the client device when compared to a separate remote control.

The method is illustrative of the invention and the principles associated with the method are applicable to the system and computer readable medium. A method for syncing a user interface on a server device to a user interface on a client device is disclosed. The method includes broadcasting a signal from a server device to a client device when the server device presents an active user input interface on a display screen, wherein the active user input interface illustrates input from a user via a remote control that is separate from the client device, wherein the remote control requires multiple steps for inputting a character. The multiple steps are represented typically by a remote that does not have a QWERTY keyboard and that requires a user to navigate through a user interface to select characters for input. The method next includes establishing a connection between the server device and the client device if certain pre-defined criteria are met, and loading parameters to a client device to provide a client user input interface on the connected client device that is associated with the active user input interface, including loading existing data in an input field of the active user input interface into a client input field on the client device. The actual visual presentation of the client input interface may be client device dependent and change from device to device. Next, the method includes receiving character input sent from the connected client device to the server device via the client user input interface, wherein the character is received via a single step. This is typically represented by the client device having an interface where each letter of a full keyboard can be accessed directly, either via dedicated physical keys or touch input. From there, the method includes updating the input field of the active user input interface with the received character input from the client user input interface. Finally, the method includes removing the client user input interface on the client device upon the occurrence of an event. One application of this invention is a client device that is capable of syncing with a server device. Another application of this invention is a server device that is capable of syncing with a client device.

This is not an exhaustive list. Any server device that syncs with a client device to assist in the input of characters through an input user interface can benefit from the disclosed system and method for syncing a user interface on a server device to a user interface on a client device.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only exemplary embodiments of the invention and are not therefore to be considered to be limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

In order to address the issues set forth above, a system is used to simplify and make it easier to input characters into an active input user interface on a server device that has a remote device with limited inputs. The system utilizes approved client devices to load parameters associated with a client user input interface on a connected client device that is associated with an active user input interface on the server device. In one example, a user navigates to a digital video content library on the server device. The user may also navigate through an internet browser from the server device. The user then enters an active input user interface to type in a string of characters in order to search for videos with this string in its metadata. The server sends out a broadcasting signal and activates a user's nearby client device such as a smart phone or laptop computer. The client device loads parameters that enable the client device to present a client user input interface that is associated with the active user input interface on the server device. In this example, parameters that enable a QWERTY keyboard user interface to be presented on the client device are transmitted to the client device. The particular structure and visual image of the input interface can be device dependent such that it can be tailored for the particular capabilities, display screen, and so forth of each client device. The user can then type the characters desired for entry to the server device by typing the characters into the connected smart phone, laptop, or other portable computing device. Upon a designated event, such as the server device exiting the active input interface, the client device (i.e. smart phone or personal computer) will return to its normal operation. One benefit of this approach is the ability of the client device to have a better interface (such as a QWERTY keyboard) than a remote control or other device that requires navigation.

Figure 1:
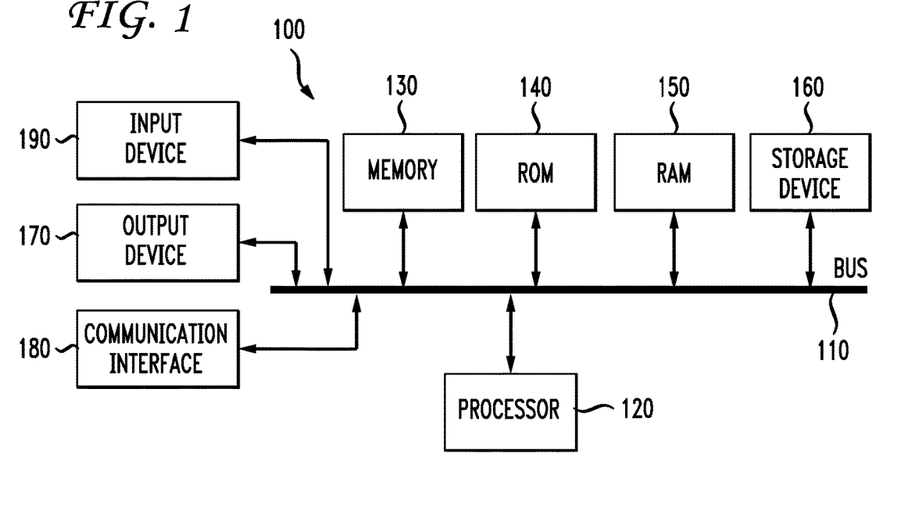
FIG. 1 illustrates an example system embodiment.

Prior to discussing the details more fully, the disclosure next presents the basic hardware components associated with the system embodiment of the invention. With reference to FIG. 1, an exemplary system includes a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the invention may operate on a computing device with more than one CPU 120 or on a group or cluster of computing devices networked together to provide greater processing capability. The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input and so forth. The device output 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on the invention operating on any particular hardware arrangement and therefore the basic features here may easily be substituted for improved hardware or firmware arrangements as they are developed.

For clarity of explanation, the illustrative system embodiment is presented as comprising individual functional blocks (including functional blocks labeled as a "processor"). The functions these blocks represent may be provided through the use of either shared or dedicated hardware, including, but not limited to, hardware capable of executing software. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided. These components may apply to a server, client device, remote, and so forth.

Having disclosed the basic components of the system embodiment, the disclosure now returns to the details of the system and method for syncing user interfaces. As noted above, the present disclosure enables a system, method, and computer-readable medium for determining distribution of change in a referenced object to a referencing object. Any data structure that is organized with a referencing object may reference a referenced object.

Figure 2:
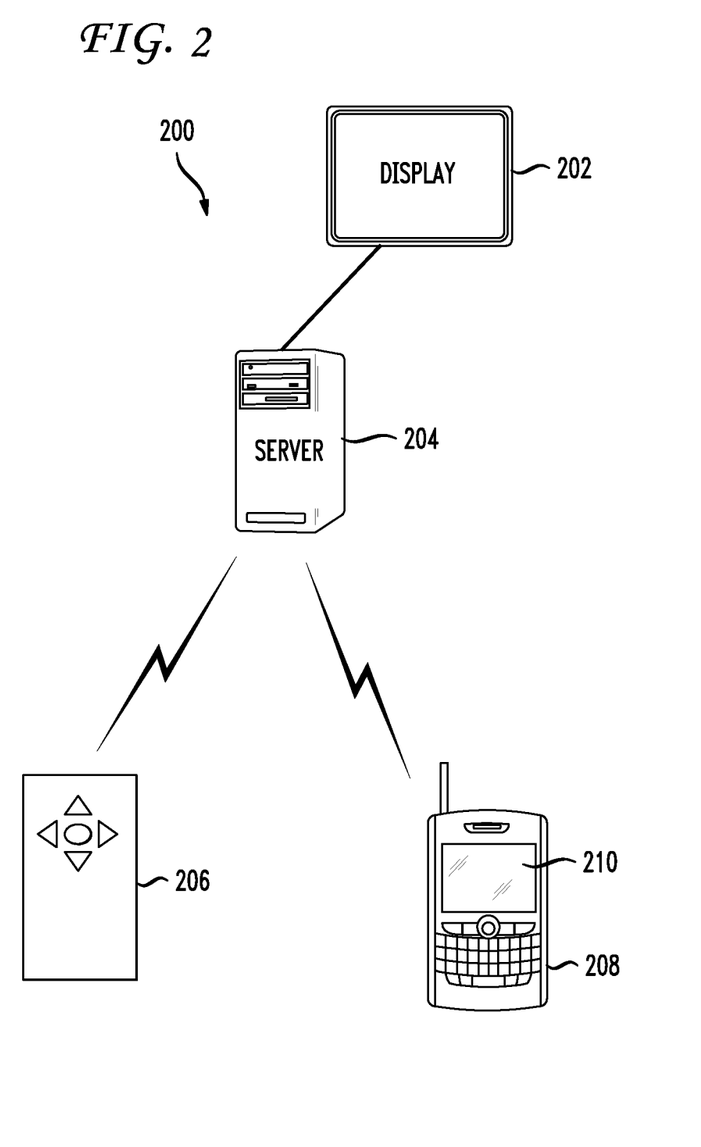
FIG. 2 illustrates an example embodiment of a server device and client devices.

FIG. 2 illustrates an example an example embodiment of a server device and client devices in a networked configuration 200. The system for syncing user interfaces includes a content server 204. The content server includes a storage device (not shown) for storing content data such as movies, music, pictures, documents, games, applications, and any other content that can be expressed in digital form. The storage device may be a hard drive, solid-state drive, non-volatile flash memory drive or any other device containing a tangible medium capable of storing data.

The server 204 may have outputs for video data and audio data. The server may further have a network connection, such as an Ethernet port, an integrated wireless router, or an infrared transmitter/receiver, for communicating with a local network and/or communicating over the Internet.

As shown in FIG. 2, the server device 204 is connected to a display 202. The display 202 may be a high-definition television, standard definition television, computer monitor, projector, or any other type of display. Other devices configured to accept video signals and display them may act as a display 202. The display may be connected to the server any number of ways, including analog RCA type cables, an HDMI cable, a DVI cable, SCART cables, D-Sub 15 cable, etc. The server may connect to the display through other connection technologies such as wireless communication.

The server 204 may accept input from a remote device 206. In this embodiment, the remote device sends infrared signals that are received and decoded by the server device. As shown in FIG. 2, the remote device includes an up arrow, down arrow, right arrow, left arrow, play/pause button, and select button. In this embodiment, as illustrated in FIG. 2, the play/pause button is surrounded by the four arrow buttons, which all are above the select button on the remote device. The remote 206 or device 206 generally represents a remote unit that has a limited input ability. This ability may be absolute (i.e., not a QWERTY keyboard) or may be relative to another device 208 (i.e., a QWERTY keyboard but not a convenient keypad entry interface). In other words, a benefit of this disclosure is the ability to present a more convenient interface via device 208 then is available on device 206. Furthermore the server 204 may send a broadcast signal to connect with a remote device 208. The client device may be a cell phone, smart phone, laptop computer, desktop computer, or any other device capable of wired or wireless digital communication. Devices 206 and 208 may also be referred to as remote controls inasmuch as they are used to receive input for the server 204.

In once aspect, the server 204 is a multi-input electronic device including a first display 202 and a network connection for communication with other devices. A processor is coupled to the network connection and the display, and is configured to display on the first display a dialog box and a first keyboard, to receive user input in the dialog box based on spatial navigation and selection of keys displayed in the first keyboard using a first remote control 206, and to receive user input also from a second remote control 208 over the network connection, the second remote control 208 having a second display, and displayed thereon a virtual keyboard allowing direct user key selection, and indicia of such selections being provided through the network connection to the processor. The virtual keyboard may alternately be a physical keyboard as is shown in FIG. 2.

The processor maintains a dialog box displayed on the second display with data inputted from the first remote control by providing messages indicating such inputted data to the second remote control. The first remote control 206 includes an up, down, left and right key for spatial navigation of the first keyboard, a current key position indicated by highlighting, and a selection key for indicating selection of currently highlighted key. In general, the first remote control has a more limited input capability and requires more navigation via a user interface than does the second remote control 208.

As shown in FIG. 2, the client device 208 has a touch screen display 210 as well as a physical keyboard and trackball. Embodiments the client device may have a user interface that is entirely touch sensitive or a configuration with a non-touch sensitive display plus separate user input capabilities such as keys, trackballs, or other navigational tools. The client device may have a full QWERTY keyboard, although other types of keyboards may be utilized as well. The concepts disclosed herein apply to any type, variation or multiple modalities of user input.

The server device 204 can broadcast a signal from a server device to a client device when the server device 204 presents an active user input interface on a display screen 202, wherein the active user input interface illustrates input from a user via a remote control 206 that is separate from the client device, wherein the remote control 206 requires multiple steps for inputting a character. Then a connection can be established between the server device 204 and the client device 208 if certain pre-defined criteria are met. Pre-defined criteria may include checking if a client device is on an approved communication list. In another aspect, the user interface of device 206 may be compared with that of 208 to determine whether the new device 208 can provide an easier user input than device 206. In this case, the criteria may be met and the broadcast occurs to provide the improved interface on device 208. In other embodiments pre-defined criteria may include a request for a password from the server the device and a valid password sent in return from the client device. The password may be encrypted using a standard protocol such as WPA encryption.

The client device 208 can then present a client user input interface that is associated with the active user input interface on the server, including loading existing data in an input field of the active user input interface into a client input field on the client device. The interface can be loaded in a graphical form on screen 210. The screen may not be a touch screen, but the device, as is shown in feature 208, may already have a QWERTY keyboard that is used.

In another embodiment, device 208 is a device for receiving user input destined for remote electronic devices and includes a wireless network interface, a display having a touch sensitive surface or a physical keyboard. Device 208 includes a processor coupled to the wireless network interface and configured to execute computer readable instructions stored on a computer readable medium to: accept an indication from a user to enter input to be provided to a remote electronic device, request, from the remote electronic device, an indication of a keyboard type to display; display on the display a keyboard according to the keyboard type indicated, receive user input from the keyboard by interpreting user contact with the display as key presses and transmits the user input to the remote electronic device over the wireless network interface.

The device 208 may further request, of the remote electronic device, a message to be sent by the remote electronic device in response to receiving input from the keyboard or a second user input source, and display in a dialog window the input indicated as being received by the remote electronic device. The device 208 may also request, of the remote electronic device, a message to be sent by the remote electronic device in response to receiving input from a second user input source.

Figure 3A:
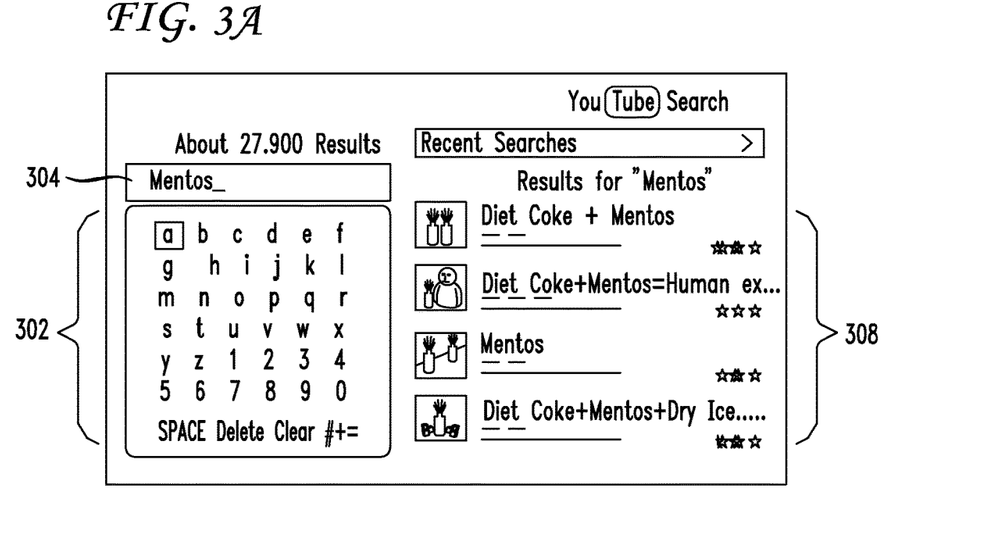
FIG. 3A illustrates an active user input interface for a server device.

FIG. 3A illustrates a server device 204 presenting an active user input interface on a display screen 202, wherein the active user input interface illustrates input from a user via a remote control 302 that is separate from the client device. The active user input interface 302 on the display screen 202 includes a sequential alphabetic listing, a sequential numeric listing, and "Space", "Delete", "Clear", and "#+=" keys.

If a user wishes to input character string "Mentos" into to the active user input interface on a display screen 202 as shown in FIG. 3A by using the remote device 206, the user must navigate the displayed cursor to each character using the arrow keys and depress a key to choose the given character. FIG. 3A also includes a feedback display 304 that indicates characters already entered by the user for this string. Additionally, FIG. 3A shows results for video data files 308 that have metadata corresponding to the string entered by the user in the active user input interface.

Figure 3B:
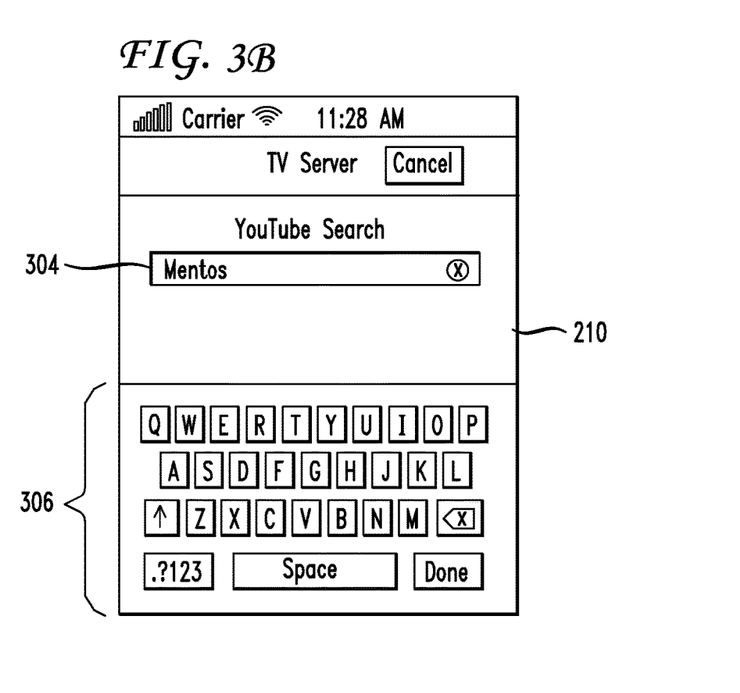
FIG. 3B illustrates a user input interface on the connected client device that is associated with the active user input interface active interface of FIG. 3A.

FIG. 3B illustrates a user input interface on the connected client device 208 that is associated with the active user input interface active interface of FIG. 3A. The client user input interface is shown on the display of a client device 208, which as stated above may be a smart phone or personal computer. The client user input interface includes a QWERTY keyboard 306. The keyboard 306 also includes "shift", "enter", "space", "done" keys, as well as keys to enter numeric characters and punctuation. FIG. 3B also includes a feedback display 304 that indicates characters already entered by the user for this string. If client device 208 already has a physical keyboard, then the display may present the search field, as would be done with the device 208 shown in FIG. 2.

A comparison of FIGS. 3A and 3B shows that, in this embodiment, the QWERTY keyboard input interface 306 of the client device is associated with the sequential character listing active user input interface 302 of the server 204. They are not duplicate interfaces, though. The two interfaces may be quite different, substantially smaller, or exact, depending on the application.

The presentation of the user interface on the client device 208 will be removed when the input user interface on display 202 is removed. This may occur, for example, if the user dismisses the interface by hitting a menu key on remote 206 and then navigating to a video to watch. The presentation on device 208 of a user interface and then removing or hiding that interface is tied to the showing and hiding of the interface on display 202, with the exception of the cancel button on the client keyboard which cases the client user interface or keyboard to be dismissed without hiding the keyboard on the server display 202. After such an event, the server display 202 shows the selected video (or other navigated image or menu etc.) and the client device 208 returns to its normal operation prior to presenting the client user interface.

In contrast, if a user activates the "cancel" key on the client device interface while the client interface is loaded, this would act as an event as well, and removal of the client user input interface on the client device. Thereafter, the client device returns to its normal operation. Of course, if a new server side keyboard with a new session ID is again presented, an interface would again appear on the client device 208.

Figure 4A:
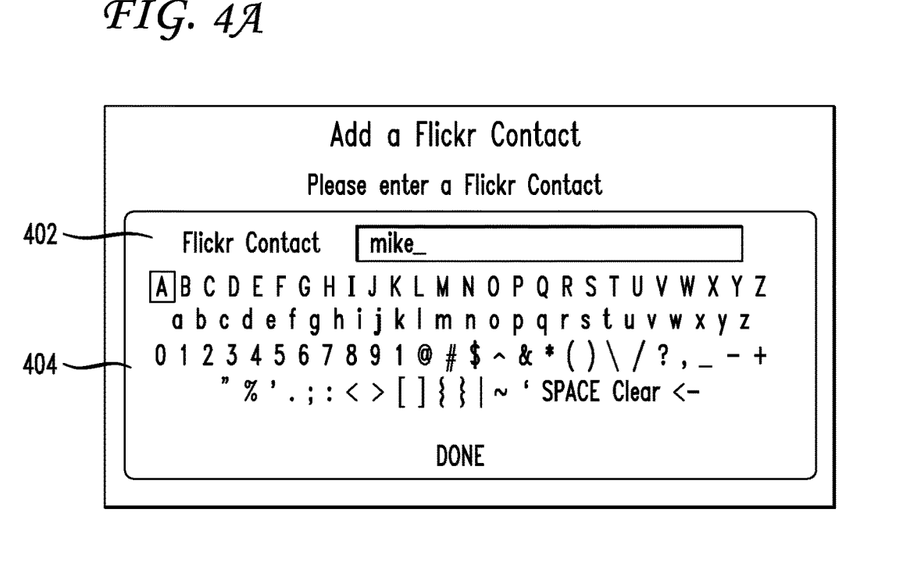
FIG. 4A illustrates an active user input interface for a server device.

FIG. 4A illustrates another embodiment of a server device 204 presenting an active user input interface on a display screen 202, wherein the active user input interface illustrates input from a user via a remote control 206 that is separate from the client device 208. The active user input interface 402 on the display screen 202 includes a sequential alphabetic listing, followed by punctuation and mathematical operator keys.

If a user wishes to input character string "mike" into to the active user input interface on a display screen 202 as shown in FIG. 4A by using the remote device 206, the user must navigate the displayed cursor to each character using the arrow keys and depress a key to choose the given character. FIG. 4A also includes a feedback display 304 that indicates characters already entered by the user for this string. The character string entered in FIG. 4A is used to locate a given username of the online application.

Figure 4B:
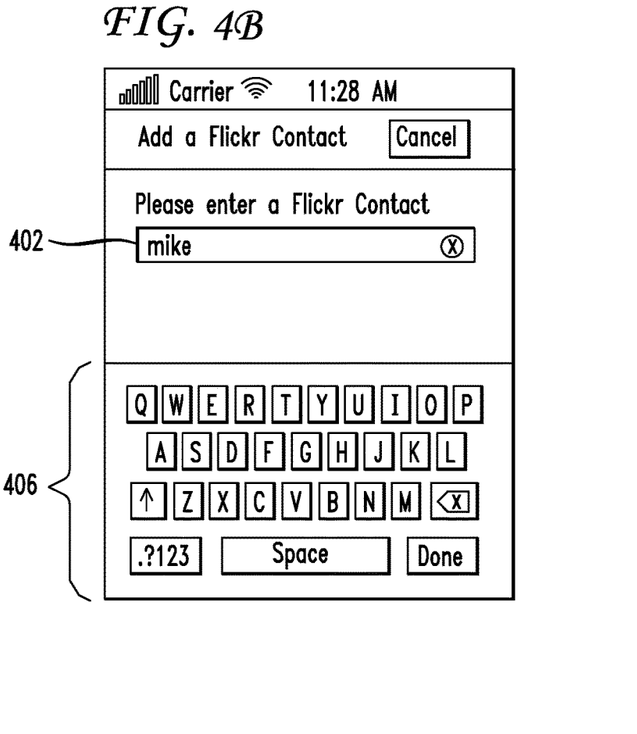
FIG. 4B illustrates a user input interface on the connected client device that is associated with the active user input interface active interface of FIG. 4A.

FIG. 4B illustrates a user input interface on the connected client device 208 associated with the active user input interface active interface of FIG. 4A. The client user input interface is shown on the display of a client device, which as stated above may be a smart phone or personal computer. The client user input interface includes a QWERTY keyboard 406. The keyboard 406 also includes "shift", "enter", "space", "done" keys, as well as a key to enter numeric characters and punctuation. FIG. 4B also includes a feedback display 402 that indicates characters already entered by the user for this string. As noted above, the keyboard 406 may be presented in a touch sensitive screen or be used as part of an existing physical keyboard on the device 208.

A comparison of FIGS. 4A and 4B shows that, in this embodiment, the QWERTY keyboard input interface 406 of the client device is associated with the sequential character listing active user input interface 404 of the server 204.

Examples of events that would cause removal of the client user input interface on the client device include if the user activates the "cancel" key on the client device interface or selects "done" on the active input interface on the server device or some other navigation event that removes the server side user input interface. After one of these events, the client device returns to its normal operation.

Figure 5A:
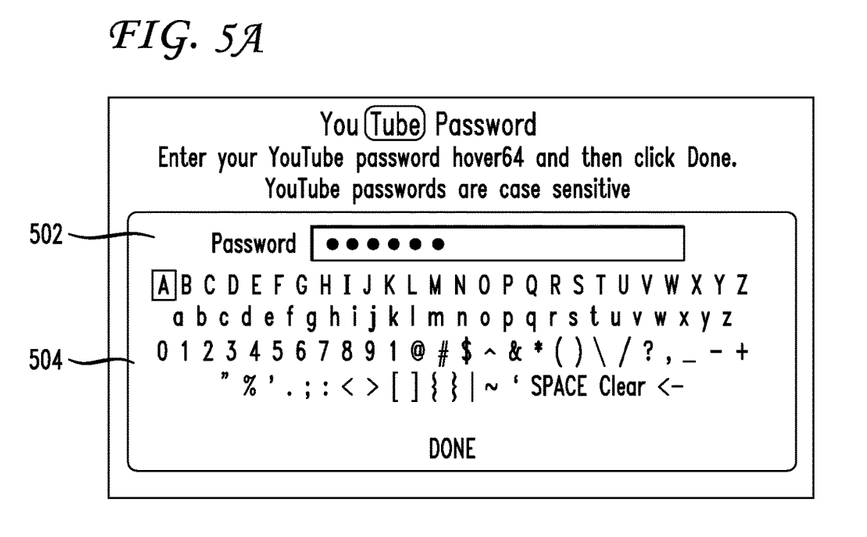
FIG. 5A illustrates an active user input interface for a server device.

FIG. 5A illustrates another embodiment of a server device 204 presenting an active user input interface on a display screen 202, wherein the active user input interface illustrates input from a user via a remote control 206 that is separate from the client device 208. The active user input interface 504 on the display screen 202 includes a sequential alphabetic listing, followed by punctuation and mathematical operator keys.

If a user wishes to input character string "password" into to the active user input interface on a display screen 202 as shown in FIG. 5A by using the remote device 206, the user must navigate the displayed cursor to each character using the arrow keys and depress a key to choose the given character. FIG. 5A also includes a feedback display 502 that indicates a bullet point character to represent each already entered character by the user for this password. The bullet point characters indicate to a user how many characters have been entered. However, the exact characters entered are not shown for security reasons and replaced by the bullet point characters. The character string entered in FIG. 5A is used to access a users online profile for a given Internet application. Specifically, in this example, the password allows a user to log on to their YouTube account. Passwords are one of many reasons to allow for text input.

Figure 5B:
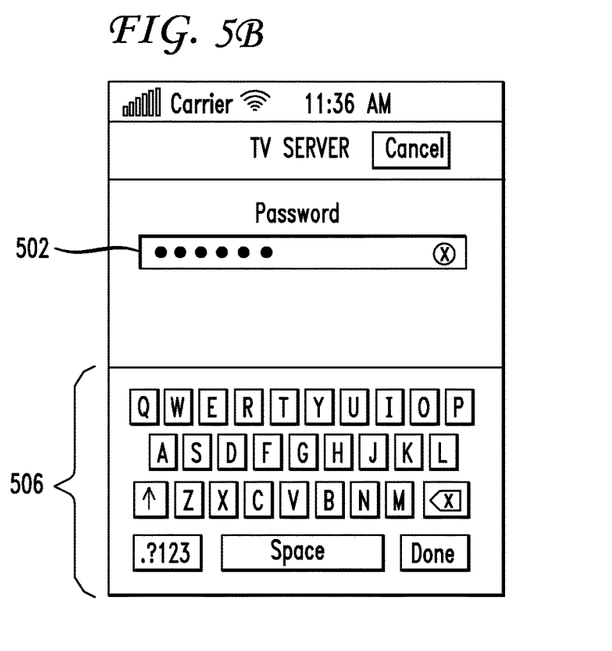
FIG. 5B illustrates a user input interface on the connected client device that is associated with the active user input interface active interface of FIG. 5A.

FIG. 5B illustrates a user input interface on the connected client device that is associated with the active user input interface active interface of FIG. 5A. The client user input interface is shown on the display of a client device 208, which as stated above may be a smart phone or personal computer. The client user input interface includes a QWERTY keyboard 506. The keyboard 506 also includes "shift", "enter", "space", and "done" keys, as well as a key to enter numeric characters and punctuation. FIG. 5B also includes a feedback display 502 that indicates an asterisk, or other representative or obscuring character for each character already entered by the user for this password.

A comparison of FIGS. 5A and 5B shows that, in this embodiment, the QWERTY keyboard input interface 506 of the client device 208 is associated with the sequential character listing active user input interface 504 of the server 204.

In this embodiment of FIGS. 5A and 5B, examples of events that would cause removing of the client user input interface on the client device include if the user activates the "cancel" key on the client device interface, the user selects "done" on the active input interface on the server device and a correct password was entered, or after a set number of unsuccessful password entry attempts. After one of these events, the client device would return to its normal operation. Other events could be designed to remove the client user input interface.

Figure 6A:
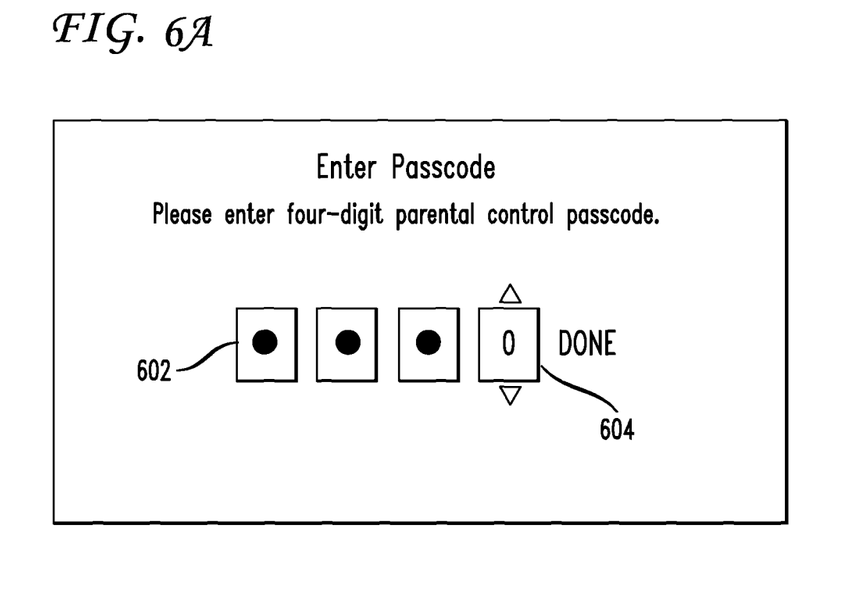
FIG. 6A illustrates an active user input interface for a server device.

FIG. 6A illustrates another embodiment of a server device 204 presenting an active user input interface on a display screen 202, wherein the active user input interface illustrates input from a user via a remote control 206 that is separate from the client device 208. The active user input interface on the display screen 202 includes four numeric character inputs 602.

If a user wishes to input a numeric password into to the active user input interface on a display screen 202 as shown in FIG. 6A by using the remote device 206, the user must scroll up or down by using the arrow keys to select the desired numeric entry and then press the select key to choose the given character. The cursor then advances to the next numeric character input. If a user selects the correct numeric character for each numeric character input access to the protected content is granted by the server device.

FIG. 6A also includes a feedback display 602 that indicates a bullet point character to represent each already entered character by the user for this password. The bullet point characters indicate to a user how many characters have been entered. However, the exact characters entered are not shown for security reasons and replaced by the bullet point characters. The password entered in FIG. 6A is used to access content restricted by parental controls.

Figure 6B:
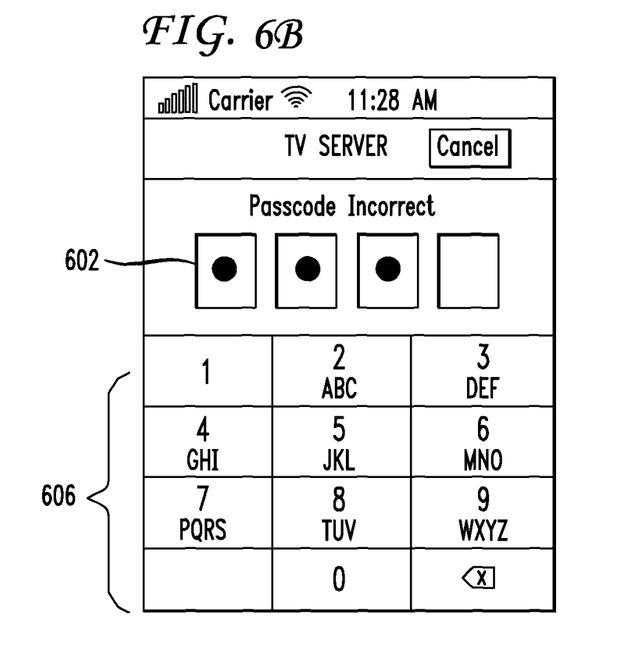
FIG. 6B illustrates a user input interface on the connected client device that is associated with the active user input interface active interface of FIG. 6A.

FIG. 6B illustrates a user input interface on the connected client device 208 that is associated with the active user input interface active interface of FIG. 6A. The client user input interface is shown on the display of a client device 208. The client user input interface includes a numeric keypad 606. The keyboard 606 also includes an "enter" key. FIG. 6B also includes a feedback display 602 that indicates a bullet point character for each character already entered by the user for this password. The passcode entry is completed on the client device automatically after entering the fourth numeral.

A comparison of FIGS. 6A and 6B shows that, in this embodiment, the numeric keypad input interface 606 of the client device 208 is associated with the sequential numeric active user input interface 604 of the server 204.

In this embodiment of FIGS. 6A and 6B, examples of events that would cause removing of the client user input interface on the client device include if the user activates the "cancel" key on the client device interface, the user selects "done" on the active input interface on the server device and a correct password was entered, or after a set number of unsuccessful password entry attempts. After one of these events, the client device would return to its normal operation. As stated above, other events could be designed to remove the client user input interface.

As can be seen in the above discussed figures, the interface on a client device 208 generally relates to the interface on display 202. However, there may be instances where the display on 202 is particularly configured for use with the remote control device 206. For example, FIG. 3A is particularly configured with the alphabetical input shown as 302 which enables the user with the device to navigate around and select letters for insertion into the input field 304. However, the user interface that is provided on client device 208 may be generated based on parameters received from the server 204. Based on the received parameters, for example, a partial user interface such as the input field may be presented on the client device given the other input capabilities of the device, such as to take advantage of an existing keyboard as is shown in FIG. 2. For example, if client device 208 has only a touch sensitive screen, then it may be necessary for a QWERTY keyboard 306 and input field 304 to be presented in full on the device 208. The received parameters will then be used to present such an interface. However, the device 208 may also already include an existing physical keyboard as is shown in FIG. 2. In this case, the server may receive information from the device 208 regarding its particular capabilities and physical layout and only need to provide a data regarding the input field 304. In this case, the parameters sent by the server do not cause the client device to load an entire user interface but only provides the necessary portion of information such that the existing capabilities of device 208 may be utilized and blended in order to both utilize and generate the overall necessary user interface that is an improvement over the interface that is shown on the display 202 in FIG. 3A.

In another aspect, the server sends the same set of parameters to any client device that are needed to display a user interface. The particular device may utilize those parameters and present the user interface that matches its capabilities. In another aspect, the server may communicate with the device and receive information regarding its capabilities and send tailored parameters regarding the type of interface to display. In another aspect, the server loads the input user interface onto the client device.

The particular user interface on the client device may be quite different, may be substantially similar, or may be the same as that which is used to interact with device 206. For example, FIG. 3A may present a QWERTY keyboard with an input field 304 that is provided similar to what is shown in FIG. 3B. However, if what is displayed on display 202 is that active user input field, but the user navigates around that input field using a remote control 206, then the user may still nevertheless need to navigate using arrow keys or the like in order to select a particular key to input into the input field. In this regard, an identical user interface may be presented on device 208 but, inasmuch as device 208 has an improved capability, such as the touch sensitive screen or existing keyboard, in which the user would not have to perform multiple steps of navigation in order to select a character for input but may only need to simply press an "R" or "Q" to select these characters, then providing the identical user interface does provide an improvement in terms of the ultimate user interaction with the system then would be achieved via a remote control 206 that has less capability with regards to how to interact with that user interface. Accordingly, one aspect of the disclosure enables a determination by the server of the capabilities of interacting with the system via device 206 or device 208. In this regard, as various users may interact with the server 204 using various kinds of different smart phones or handheld devices 208, each device may be enabled to communicate with the server and provide information regarding its user interface capabilities to enable the server to perform an analysis on whether an improved user interface capability is possible. If so, then a predefined criteria may be met and the system may then perform generally the steps disclosed herein in order to enable a user interface on the device 208 for the user to provide the necessary input.

Also, as noted herein, another aspect of the disclosure is triggering when to provide such an interface. In one aspect, display 202 may show several windows at once. In one aspect, a user interface may be shown but shaded because another window is active or another part of the display is active. In this regard, simply because a user interface is shown on display 202 that can potentially be manipulated by remote control 206, then the disclosure does not anticipate presenting a user interface display on device 208. In some situations, a presented user interface may not be active but in a background window, for example, In this case, if a window becomes activated that has such a user interface, then that user interface becomes "active" inasmuch as the user can now use the remote control 206 in order to enter information into the interface. In this case, once the interface becomes active, then the server 204 may make the determination of whether the criteria is met and establish the connection between the server device and the client device 208 and provide the client device user interface according to the principles disclosed herein. In this case, if a user is watching TV on the display 202 or using the remote, then the only time their smart phone or other device 208 would be presented with a user input interface would be only during those times when such an interface is immediately capable of interaction.

Figure 7:
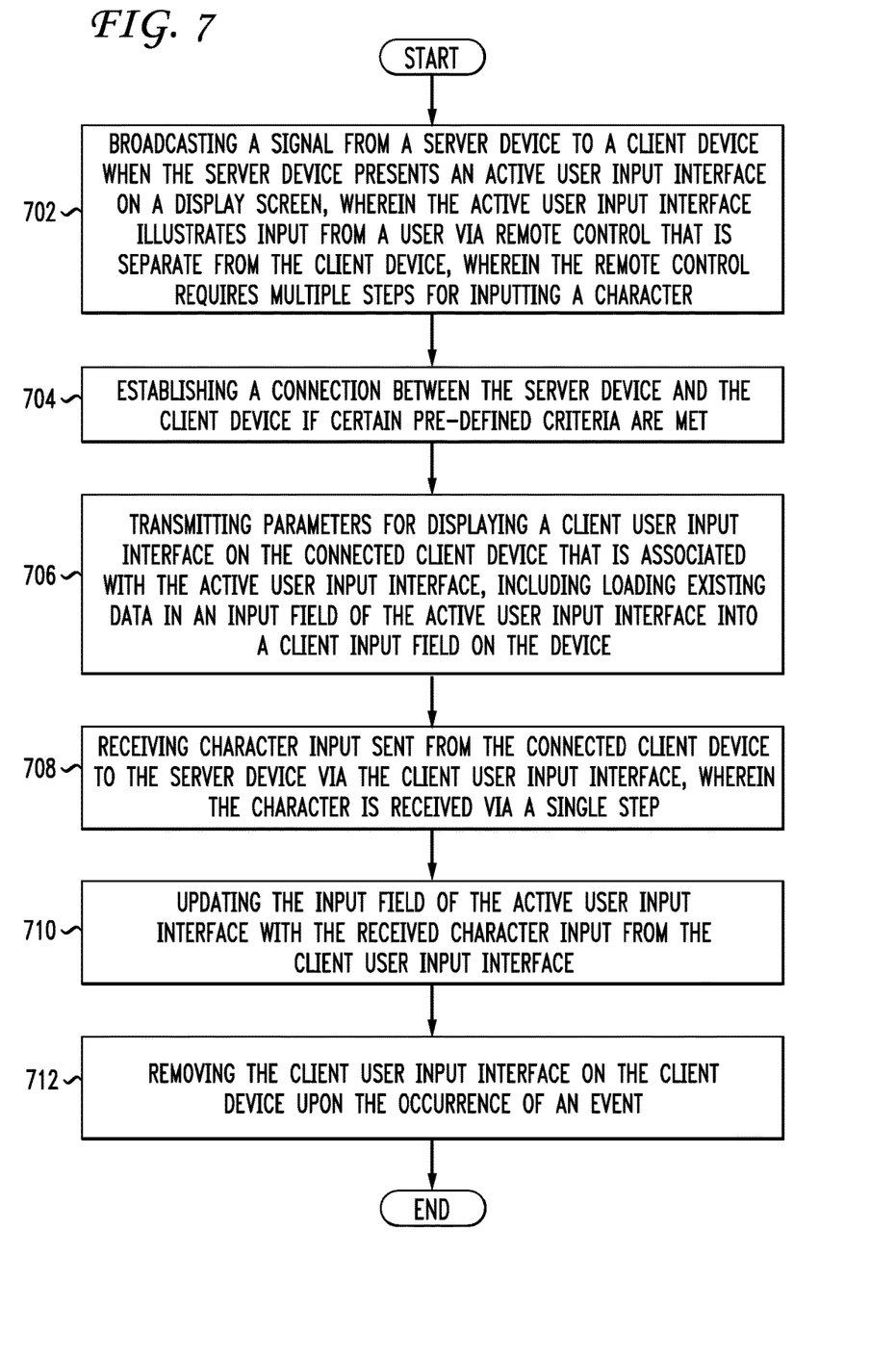
FIG. 7 illustrates example embodiment of a method for active user interface syncing.

As shown in FIG. 7, the method includes broadcasting a signal from a server device to a client device 702 when the server device presents an active user input interface on a display screen, wherein the active user input interface illustrates input from a user via a remote control that is separate from the client device, wherein the remote control requires multiple steps for inputting a character. In one aspect, the remote control only need have a slightly less advantageous or easy to use interface than the client device.

Next, the method includes establishing a connection between the server device and the client device if certain pre-defined criteria are met 704. The criteria may be many factors and could, for example, be based on an analysis of the various interfaces to determine whether an improved interface may be available via the client device 208. The method then includes transmitting parameters to a client device to display the client user input interface on the connected client device 706 that is associated with the active user input interface, including loading existing data in an input field of the active user input interface into a client input field on the client device.

Next, the method includes receiving character input 708 sent from the connected client device to the server device via the client user input interface, wherein the character is received via a single step. The method further includes updating the input field of the active user input interface 710 with the received character input from the client user input interface. Finally, the method includes removing the client user input interface on the client device upon the occurrence of an event. In one embodiment the event wherein the event may be one of: when the server device removes or deactivates the active user input interface or upon instructions from the user via the client device.

As discussed above, the client user input interface can include any combination of a QWERTY keyboard, numerical input, or graphical input. The server input interface can be tailored for input from the remote control and the client input interface can be configured from an input of the client device. In one embodiment, the server input interface includes a sequential alphabetic input interface and the substantially duplicate client input interface includes a corresponding QWERTY input interface. In another embodiment, the client input interface and server input interface includes handwriting recognition, such as the Graffiti software in Palm OS. Handwriting recognition can be accomplished with a touch-sensitive screen integrated into a display or a touch-sensitive pad that is not a display. A user can perform handwriting for recognition by a finger, stylus, or other suitable device. Handwriting recognition input can allow, for example, the full range of input for Asian language characters without the need to provide an incomplete keyboard due to lack of display space or provide keys that are too small or too low-resolution to be useful. Additionally, the client input interface and server input interface may allow the input of any other non-Roman characters such as Cyrillic, Armenian, or Devanagari.

As described above, in one embodiment the client device is a personal computer. In another embodiment of the method the pre-defined criteria includes approval of passcode to designate an approved device. This passcode may be a Wi-Fi Protected Access (WPA) encrypted password or similar authentication phrase. Other security mechanisms such as certificates for message authentication and key exchanges for facilitate encryption and decryption of data may be used as well. Furthermore, the connection between the server device and client device may be a WiFi, Bluetooth, or infrared communication. Other suitable digital communication methods are contemplated as within the scope of this disclosure.

In another aspect, the disclosure covers a client device embodiment. Here, the device for receives user input destined for remote electronic devices. The device includes a wireless network interface and a display having a touch sensitive surface. As noted above, the display may also not be touch sensitive but the device may include a separate physical keyboard that may or may not be QUERTY configured. The device further includes a processor coupled to the wireless network interface and configured to execute computer readable instructions stored on a computer readable medium. The instructions will execute a method including: accepting an indication from a user to enter input to be provided to a remote electronic device, requesting, from the remote electronic device, an indication of a keyboard type to display, displaying on the display a keyboard according to the keyboard type indicated and receiving user input from the keyboard by interpreting user contact with the display as key presses. The request may also not indicate a keyboard type to display but may include notification that a physical keyboard of some configuration already exists on the device and the request may notify the remote system regarding what additional display features should be provided to compliment the keyboard. The keyboard type is selected based on an input type required by the remote electronic device. The input types include alphanumeric input, e-mail address input, URL input, and a distinct keyboard type is selected for each input type.

The method further includes transmitting the user input to the remote electronic device over the wireless network interface. The method may further include requesting authentication from the remote electronic device to provide input to it. The remote electronic device can be capable of receiving input from a second user input source. The method may further include receiving, from the remote electronic device, a message indicating input received by the remote electronic device from the second user input source, and displaying the input on the display.

Other aspects include the method requesting, of the remote electronic device, a message to be sent by the remote electronic device in response to receiving input from the keyboard or a second user input source, and displaying in a dialog window the input indicated as being received by the remote electronic device. The method may request, of the remote electronic device, a message to be sent by the remote electronic device in response to receiving input from a second user input source. The TCP/IP protocol may be used to send and receive messages from the remote electronic device. The message being sent by the remote electronic device in response to receiving input from a second user input source.

The method may further include authenticating using a shared wireless key, and requesting a separate security certificate for a remote input session. The computer readable medium stores keyboard definition information for each keyboard type supported in the system, and the indication causes retrieval of the keyboard definition information for composing a display of the keyboard according to the indicated keyboard type.

The concepts disclosed herein also apply to multiple client devices 208. Here, the system and connect, transmit and receive input from multiple, simultaneously connected client devices. This may be especially useful in gaming settings with multiple players or a party setting where multiple participants with their smartphones may want to add songs to a playlist. In this scenario, assume that one client device is in the middle of inputting a search phrase into a search field. Another client device is connected and receives the parameters for the user interface. On the second client device, the interface receives and displays the text being input by the first client device. The messages from the server always contain the entire string being input as well as the parameters for the user interface. Thus, the entire string always appears on all client devices.

Yet another embodiment relates to a remote user input device method. This method includes, from a first device, communicating over a wireless network to a second device for requesting a first virtual keyboard to be displayed on a first, touch sensitive, display associated with the first device. The virtual keyboard may comprise a keyboard exclusively interacted with via a touch sensitive screen. The virtual keyboard may be replace with a physical keyboard on the first device, depending on the configuration of the first device. The method further includes selecting a type of keyboard based on a context of a current user input cursor location in a second display associated with the second device and transmitting an indication of the type of keyboard to the first device. The method next draws the first virtual keyboard according to the indicated keyboard type on the first display and accepts user input based on detected key selections at the first virtual keyboard. Finally, the user input is communicated to the second device over the wireless network.

In addition to input field data being sent to the client device in each message from a server, other data is sent as well. For example, FIG. 3B shows a title "YouTube Search" and the title string "TV Server." This title information is also sent as part of the keyboard parameter message to the client device or client devices. The client device then presents the title or other information in the client side user input interface appropriately on its interface. Therefore, information in additional to input field data may be sent that provides labels, titles, descriptions, images, and so forth for enhancing the client side user interface. These images or information may or may not duplicate information on the server display 202 user interface.

One aspect of the disclosure is a client device 208 focused interaction and processing. Here, the method includes syncing a user interface on a server device to a user interface on a client device. The method includes, on the client device, receiving a signal broadcast from a server device to the client device when the server device presents an active user input interface on a display screen, wherein the active user input interface illustrates input from a user via a remote control that is separate from the client device, wherein the remote control requires multiple steps for inputting a character. The method next includes establishing a connection between the server device and the client device if certain pre-defined criteria are met, receiving parameters from the server device for displaying a client user input interface on the connected client device that is associated with the active user input interface, including loading existing data in an input field of the active user input interface into a client input field on the client device and transmitting character input sent from the connected client device to the server device via the client user input interface, wherein the character is received via a dedicated key or touch point for the character on the client user interface. The client device will removes the client user input interface on the client device upon the occurrence of an event. The event may be any event as noted above which removes the active status of the interface from display 202.

In another aspect, the focus is on the processing from the viewpoint of the server device 204. Here, the method synchronizes a user interface on a server device to a user interface on a client device. The method includes, on the server device, broadcasting a signal from the server device to a client device when the server device presents an active user input interface on a display screen, wherein the active user input interface illustrates input from a user via a remote control that is separate from the client device, wherein the remote control requires multiple steps for inputting a character. Next, the method establishes a connection between the server device and the client device if certain pre-defined criteria are met and transmits parameters (from the server device to the client device) for displaying a client user input interface on the connected client device that is associated with the active user input interface, including loading existing data in an input field of the active user input interface into a client input field on the client device. The server device receives character input sent from the connected client device to the server device via the client user input interface, wherein the character is received via user interaction with a dedicated key or touch input. The server device updates the input field of the active user input interface with the received character input from the client user input interface and transmits an instruction to the client device to remove the client user input interface on the client device upon the occurrence of an event.

Embodiments within the scope of the present invention may also include a computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. A "tangible" computer-readable medium expressly excludes software per se (not stored on a tangible medium) and a wireless, air interface. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in standalone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps. Program modules may also comprise any tangible computer-readable medium in connection with the various hardware computer components disclosed herein, when operating to perform a particular function based on the instructions of the program contained in the medium.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (by hardwired links, wireless links, or a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. Accordingly, the appended claims and their legal equivalents should only define the invention, rather than any specific examples given.

We claim:

1. A method for interacting with a server, the method comprising:
   in the server, performing operations for:
      presenting a user input interface on a display coupled to the server, the user input interface comprising a listing of characters and an entry box;
      wherein the server is configured to enter a character in the entry box in the user input interface by either of:
         receiving direction indications from a client to navigate a cursor sequentially through the listing of characters on the display to a character that is selected to be entered into the entry box; and
         receiving a selection indication from the client to cause the selected character to be entered into the entry box; or
         receiving a character that was sent from the client to the server; and
         causing a corresponding character to be entered into the entry box without receiving direction indications or a selection indication.

2. The method of claim 1, further comprising:
causing the client to present, on a display of the client, a user input interface for entering a character that is different than the user input interface presented by the server.

3. The method of claim 2, wherein the user input interface presented by the client comprises an input mechanism configured to receive a character entry without receiving direction indications or a selection indication.

4. The method of claim 3, wherein the input mechanism comprises one of:
a keyboard presented on a display of the client; or
an entry box configured to receive characters entered using a keyboard on the client.

5. The method of claim 2, wherein the user input interface presented by the client comprises an input mechanism configured to receive a character entry using an entry mechanism available on the client.

6. The method of claim 5, wherein the input mechanism comprises one of:
a keyboard presented on a display of the client; or
an entry box configured to receive characters entered using a keyboard on the client.

7. A server, comprising:
a processor, the processor configured to perform operations for:
presenting a user input interface on a display coupled to the server, the user input interface comprising a listing of characters and an entry box;
wherein the server is configured to enter a character in the entry box in the user input interface by either of:
receiving direction indications from a client to navigate a cursor sequentially through the listing of characters on the display to a character that is selected to be entered into the entry box; and
receiving a selection indication from the client to cause the selected character to be entered into the entry box; or
receiving a character that was sent from the client to the server; and
causing a corresponding character to be entered into the entry box without receiving direction indications or a selection indication.

8. The server of claim 7, further comprising:
causing the client to present, on a display of the client, a user input interface for entering a character that is different than the user input interface presented by the server.

9. The server of claim 8, wherein the user input interface presented by the client comprises an input mechanism configured to receive a character entry without receiving direction indications or a selection indication.

10. The server of claim 9, wherein the input mechanism comprises one of:
a keyboard presented on a display of the client; or
an entry box configured to receive characters entered using a keyboard on the client.

11. The server of claim 8, wherein the user input interface presented by the client comprises an input mechanism configured to receive a character entry using an entry mechanism available on the client.

12. The server of claim 11, wherein the input mechanism comprises one of:
a keyboard presented on a display of the client; or
an entry box configured to receive characters entered using a keyboard on the client.

* * * * *